(12) United States Patent
Sieracki et al.

(10) Patent No.: US 11,689,591 B2
(45) Date of Patent: Jun. 27, 2023

(54) MESH MANAGEMENT FOR REDISTRIBUTION OF ONLINE EVENTS

(71) Applicant: Zoom Video Communications, Inc., San Jose, CA (US)

(72) Inventors: Nicholas Sieracki, Sylmar, CA (US); Michael White, Castle Rock, CO (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

(21) Appl. No.: 17/515,488

(22) Filed: Oct. 31, 2021

(65) Prior Publication Data

US 2023/0133539 A1    May 4, 2023

(51) Int. Cl.
*H04L 65/403*    (2022.01)
*H04L 65/1069*    (2022.01)

(52) U.S. Cl.
CPC ........ *H04L 65/403* (2013.01); *H04L 65/1069* (2013.01)

(58) Field of Classification Search
CPC ........................... H04L 65/403; H04L 65/1069
USPC ......................................................... 709/204
See application file for complete search history.

(56) References Cited

U.S. PATENT DOCUMENTS

| | | | |
|---|---|---|---|
| 2002/0133611 A1* | 9/2002 | Gorsuch | H04L 65/1101 709/205 |
| 2013/0191485 A1* | 7/2013 | Spencer | H04L 65/4038 709/207 |
| 2022/0247654 A1* | 8/2022 | Springer | H04N 7/147 |

FOREIGN PATENT DOCUMENTS

CN       107949010 A   *   4/2018

* cited by examiner

*Primary Examiner* — Glenford J Madamba
(74) *Attorney, Agent, or Firm* — Kilpatrick Townsend & Stockton LLP

(57) ABSTRACT

Various embodiments of an apparatus, method(s), system(s) and computer program product(s) described herein are directed to a Mesh Orchestrator. Prior to initiation of an upcoming online event, the Mesh Orchestrator identifies one or more user accounts scheduled to participate in the upcoming online event delivered via a video communication environment. The Mesh Orchestrator defines a mesh of respective client computer systems associated with the identified user accounts. The mesh is defined as including at least one mesh parent client computer system ("mesh parent") and at least one mesh child client computer system ("mesh child"). Mesh Orchestrator sends one or more child designation messages to client computer systems assigned a role of mesh child.

19 Claims, 8 Drawing Sheets

MESH MANAGEMENT FOR REDISTRIBUTION OF ONLINE EVENTS

FIELD

Various embodiments relate generally to digital communication, and more particularly, to distribution of media streams.

SUMMARY

The appended Abstract may serve as a summary of this application.

BRIEF DESCRIPTION OF THE DRAWINGS

The present disclosure will become better understood from the detailed description and the drawings, wherein.

DETAILED DESCRIPTION OF THE DRAWINGS

Figure 1A:
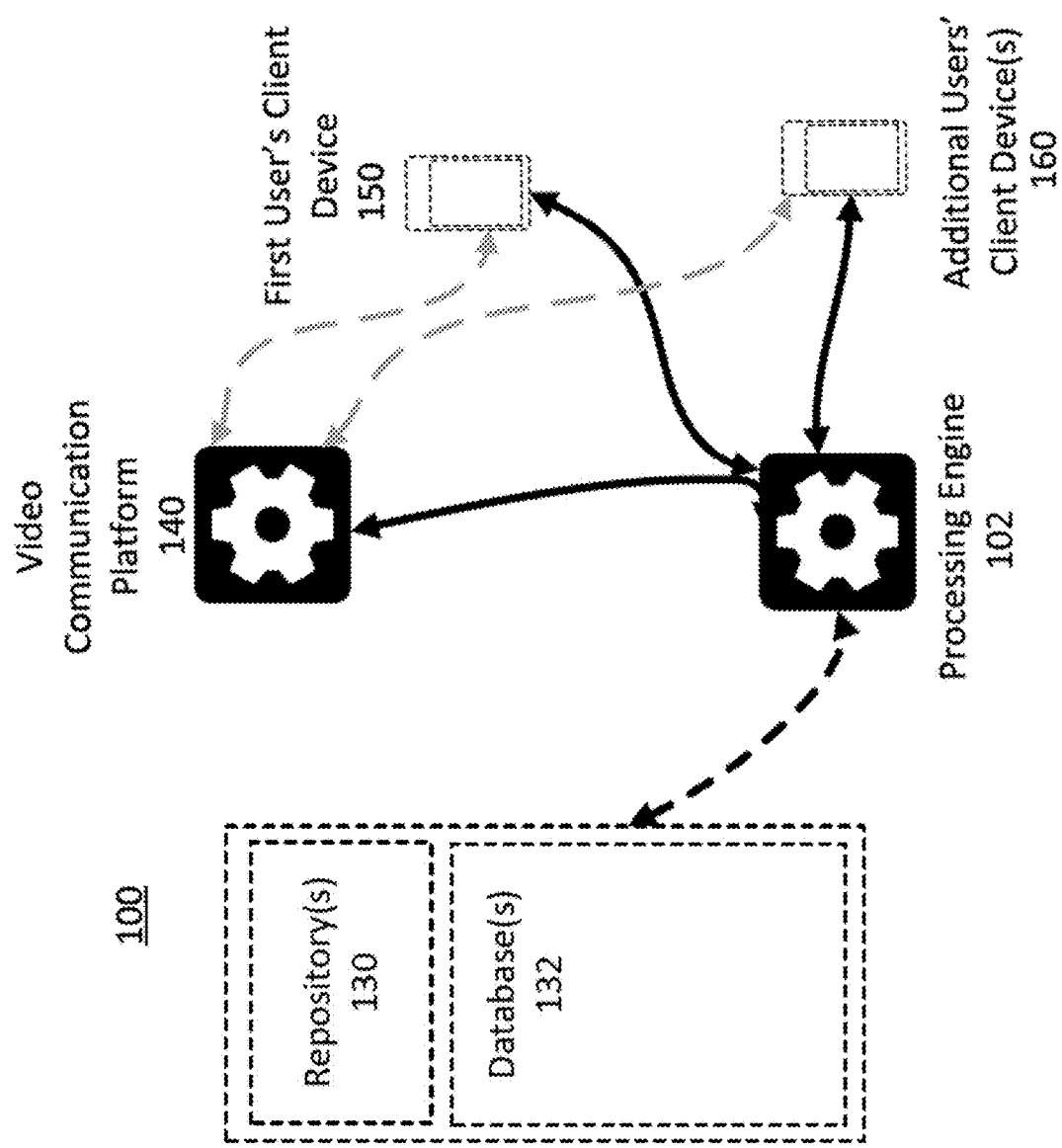
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the invention. The invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1A is a diagram illustrating an exemplary environment in which some embodiments may operate. In the exemplary environment 100, a sending client device 150, one or more receiving client device(s) 160 are connected to a processing engine 102 and, optionally, a communication platform 140. The processing engine 102 is connected to the communication platform 140, and optionally connected to one or more repositories 130 and/or databases 132 of historical virtual online event data, such as historical virtual meeting data One or more of the databases may be combined or split into multiple databases. The sending client device 150 and receiving client device(s) 160 in this environment may be computers, and the communication platform server 140 and processing engine 102 may be applications or software hosted on a computer or multiple computers which are communicatively coupled via remote server or locally.

The exemplary environment 100 is illustrated with only one sending client device, one receiving client device, one processing engine, and one communication platform, though in practice there may be more or fewer sending client devices, receiving client devices, processing engines, and/or communication platforms. In some embodiments, the sending client device, receiving client device, processing engine, and/or communication platform may be part of the same computer or device.

In an embodiment(s), the processing engine 102 may perform methods 500, 600 (of FIGS. 5, 6) or other method herein. In some embodiments, this may be accomplished via communication with the sending client device, receiving client device(s), processing engine 102, communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

Sending client device 150 and receiving client device(s) 160 are devices with a display configured to present information to a user of the device. In some embodiments, the sending client device 150 and receiving client device(s) 160 present information in the form of a user interface (UI) with UI elements or components. In some embodiments, the sending client device 150 and receiving client device(s) 160 send and receive signals and/or information to the processing engine 102 and/or communication platform 140. The sending client device 150 is configured to submit messages (i.e., chat messages, content, files, documents, media, or other forms of information or data) to one or more receiving client device(s) 160. The receiving client device(s) 160 are configured to provide access to such messages to permitted users within an expiration time window. In some embodiments, sending client device 150 and receiving client device(s) are computer devices capable of hosting and executing one or more applications or other programs capable of sending and/or receiving information. In some embodiments, the sending client device 150 and/or receiving client device(s) 160 may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the sending client device 150 and/or receiving client device(s) 160. In some embodiments, one or more of the communication platform 140, processing engine 102, and sending client device 150 or receiving client device 160 may be the same device. In some embodiments, the sending client device 150 is associated with a sending user account, and the receiving client device(s) 160 are associated with receiving user account(s).

In some embodiments, optional repositories function to store and/or maintain, respectively, user account information associated with the communication platform 140, conversations between two or more user accounts of the communication platform 140, and sensitive messages (which may include sensitive documents, media, or files) which are contained via the processing engine 102. The optional repositories may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate communication between two or more parties, such as within a conversation, "chat" (i.e., a chat room or series of public or private chat messages), video conference or meeting, message board or forum, virtual meeting, or other form of digital communication. In some embodiments, the platform 140 may further be associated with a video communication environment and a video communication environment client application executed on one or more computer systems.

Figure 1B:
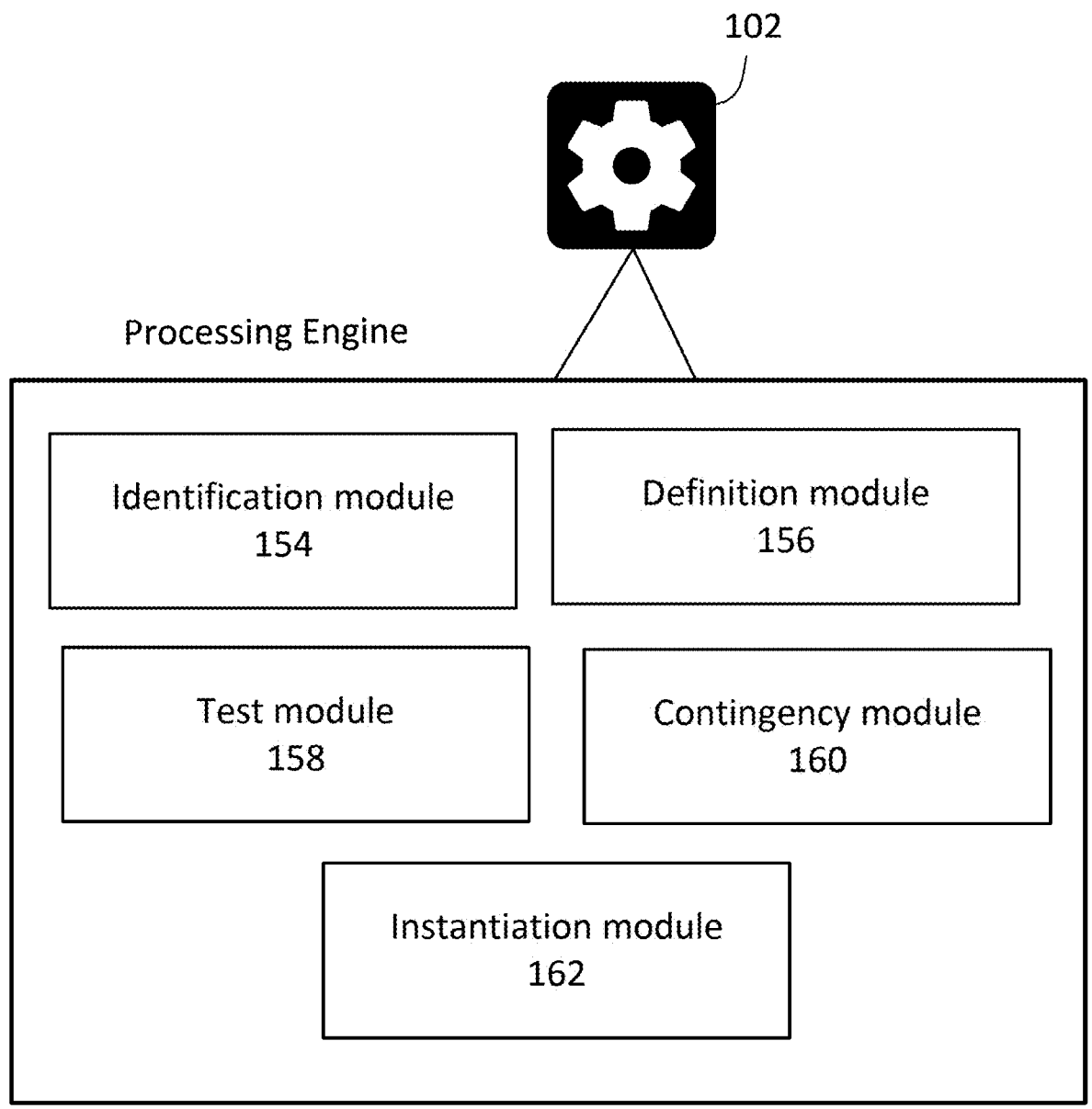
FIG. 1B is a diagram illustrating an exemplary environment in which some embodiments may operate.

FIG. 1B is a diagram illustrating exemplary software modules 154, 156, 158, 160, 162 that may execute at least some of the functionality described herein. According to some embodiments, one or more of exemplary software modules 154, 156, 158, 160, 162 may be part of the processing engine 102. In some embodiments, one or more of the exemplary software modules 154, 156, 158, 160, 162 may be distributed throughout the communication platform 140.

The identification module 154 functions to identify one or more computer systems scheduled to participate in an online event, such as a virtual meeting or an online webinar.

The definition module 156 functions to define a mesh that includes multiple identified computer systems. The definition module 156 further functions to designate mesh parent and child roles to the multiple identified computer systems and to send one or more child designation messages.

The test module 156 functions to execute one or more tests against one or more computer systems identified as being included in a mesh definition.

The contingency module 160 functions to define and apply contingency logic to a mesh definition and/or to one or more mesh instances.

The instantiation module 162 functions to instantiate a mesh based at least on a mesh definition and current availability conditions.

The above modules 154, 156, 158, 160, 162 and their functions will be described in further detail in relation to an exemplary method below.

Figure 2:
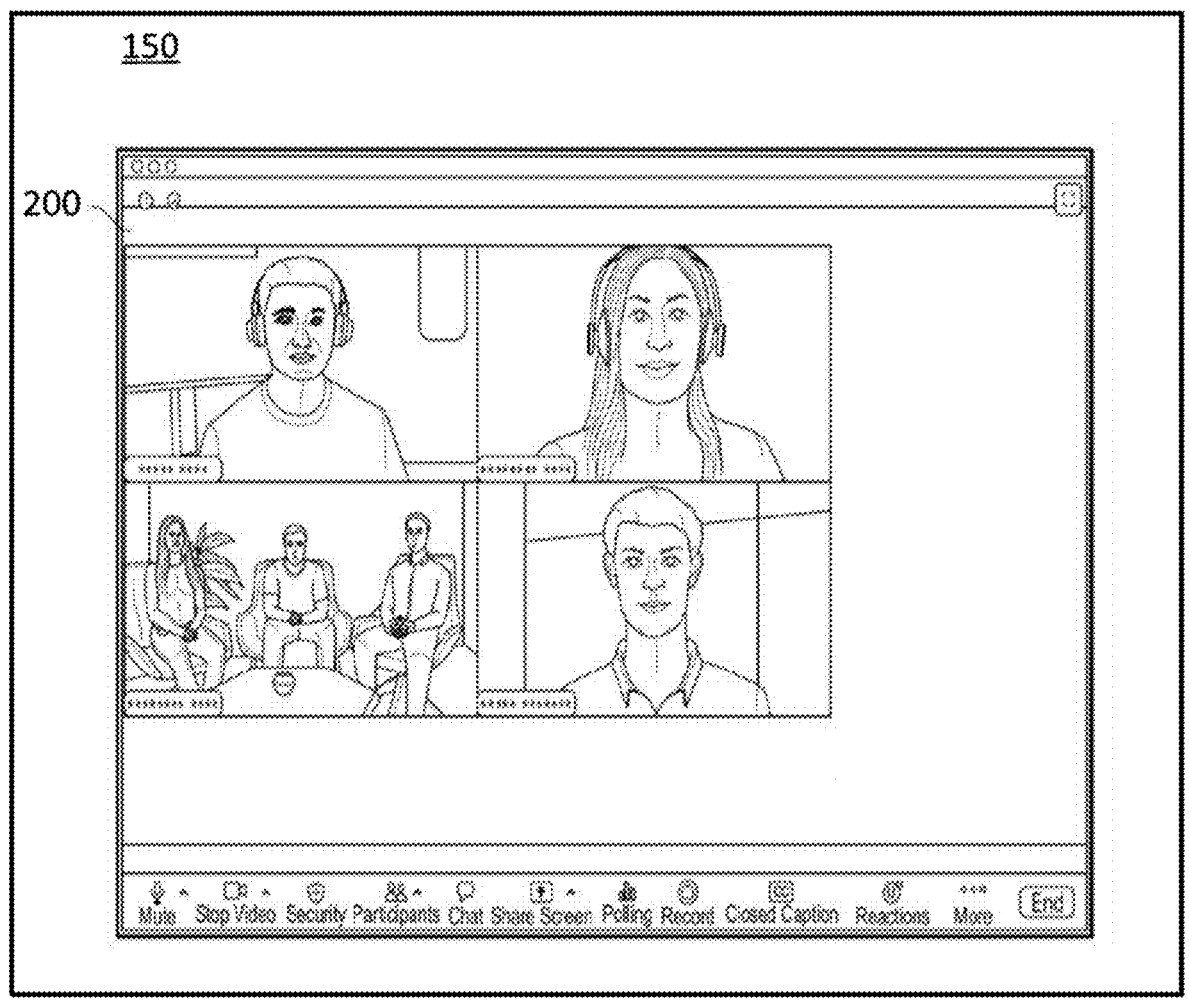
FIG. 2 is a diagram illustrating an exemplary environment in which some embodiments may operate.

As shown in the example of FIG. 2, a user account communications interface 200 for accessing and communicating with the platform 140 and displayed at a computer device 150. The interface 200 provides access to video data, audio data, chat data and meeting transcription related to an online event(s), such as a virtual webinar or a virtual meeting joined by a user account associated with the computer device 150. The interface 200 further provides various types of tools, functionalities, and settings that can be selected by a user account during an online event. Various types of virtual meeting control tools, functionalities, and settings are, for example, mute/unmute audio, turn on/off video, start meeting, join meeting, view and call contacts, send/read chat message and/or provide edits/inputs to a whiteboard functionality. The platform 140 generates historical online event data, such as historical virtual meeting data and historical online webinar data, based on user account behavior exhibited at least via the interface 200. In various embodiments, the interface 200 may be generated by a client software application associated with the platform 140.

Figure 3:
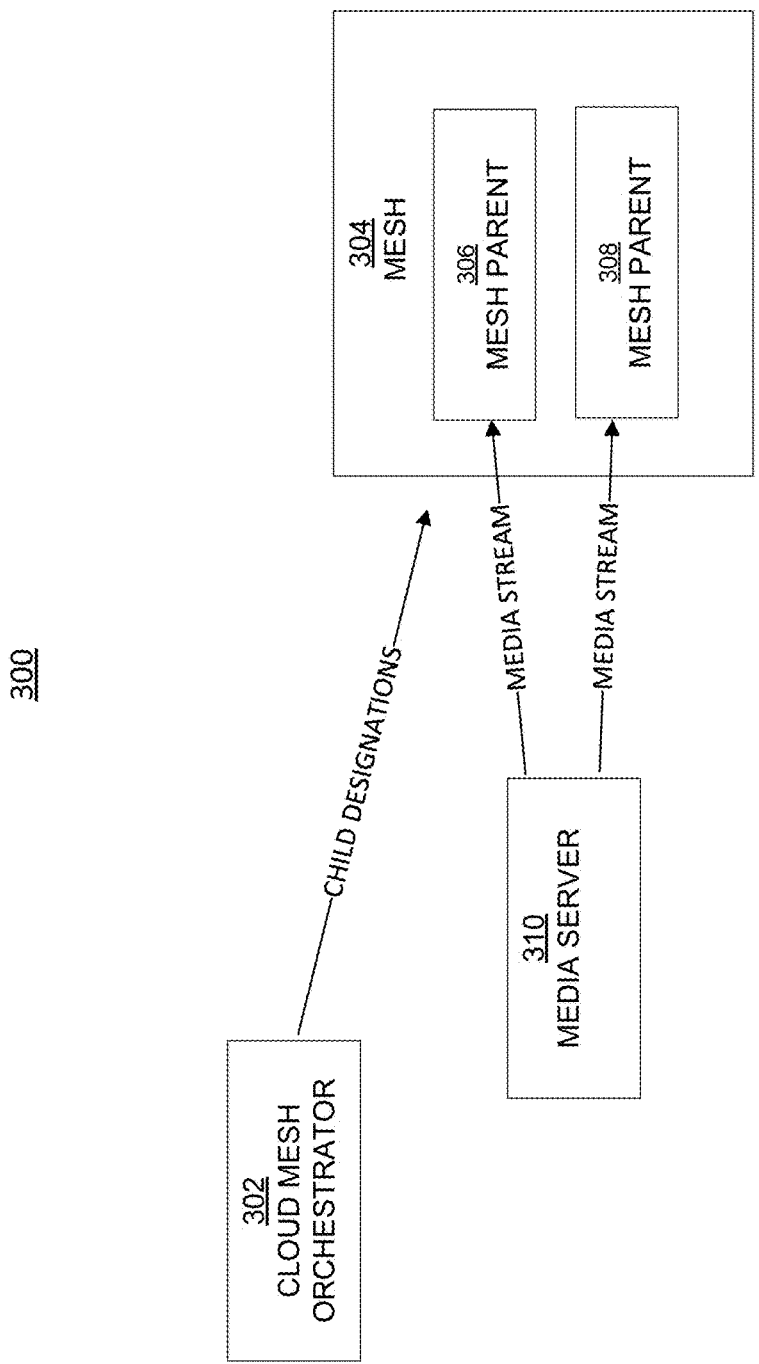
FIG. 3 is a diagram illustrating an exemplary environment in which some embodiments may operate.

As shown in diagram 300 of the example of FIG. 3, prior to initiation of a virtual meeting, the Mesh Orchestrator 302 defines a mesh of mesh parent client computer systems and mesh children client computer systems. The Mesh Orchestrator 302 sends message to each client computer system of a mesh that has been designated the role of mesh child. For example, the message may be a child designation message indicating to a particular client computer system that is has been assigned the role of being a mesh child. In addition, the child designation message further identifies a specific mesh parent from which the mesh child should request the virtual meeting stream when the virtual meeting begins.

Upon initiation of the virtual meeting, each mesh parent 306, 308 of a mesh instance 304 requests the a media stream of the virtual meeting from a media server 310. The media server 310 may be a cloud-based media server or may be an on-premise media server. In some embodiments, an organization may have a plurality of client computer systems that each run client application software for accessing and using a video communication environment that provides for the scheduling and hosting of various online event, such as virtual meetings, online webinars, online video calls, etc. The organization may use a content distribution network that sets a maximum allowable bandwidth allocated for the video communication environment. In the past, user accounts would typically login to online webinars from a personal residence location via a video communication environment client software application. However, recent user account behavior has evolved, and a recent trend shows that user accounts prefer to login to online webinars from their office or assigned physical workspaces. The maximum allowable bandwidth allocated for the video communication environment on the organization's content distribution network may be reached when a large number of on-site user account logon attempts occur for the same online event In order to avert oversubscription of network bandwidth, prior to initiation of an upcoming online webinar, the Mesh Orchestrator 302 identifies client computer systems at a same logical location that are associated with user accounts that are scheduled to login to the upcoming online webinar via the video communication environment. Prior to a start of the online webinar, the Mesh Orchestrator 302 accesses data related to the identified client computer systems that was generated by the video communication environment. For example, the Mesh Orchestrator 302 accesses historical virtual meeting data of each of the identified client computer systems and other types of data. By analyzing the accessed data, the Mesh Orchestrator 302 defines a mesh 304 of the identified client computer systems. By defining the mesh 304, the Mesh Orchestrator 302 selects one or more of the identified client computer systems to act as a mesh parent and all other identified client computer systems are designated as a respective mesh child. For example, the Mesh Orchestrator 302 ranks the identified client computer systems based on each computer system's historical virtual meeting data. Higher ranked computer systems are candidates for the mesh parent role. Lower ranked computer systems are candidates for the mesh child role.

Prior to a start of the online webinar, the Mesh Orchestrator 302 runs various tests on the defined mesh 304 and further defines contingency logic. For example, the contingency logic may include one or more commands for changing a mesh definition and/or mesh instance while the online webinar is actually being streamed. Such contingency logic commands may include commands for changing a mesh parent, changing a mess child and/or setting a type of visual display layout (i.e., user interface configuration) that must be used by one or more of the mesh client computer systems that have actually logged onto the online webinar. As the online webinar is initiated, the Mesh Orchestrator 302 instantiates a version of the mesh 304 (i.e. mesh instance) based on the defined mesh 304 and the mesh client computer systems that are actually logging onto the online webinar. Once the mesh instance has been implemented, each mesh parent 306, 308 requests the online webinar's media stream from a media server and each mesh child requests the online webinar's media stream from a particular mesh parent 306, 308 identified in a received child designation message.

Figure 4:
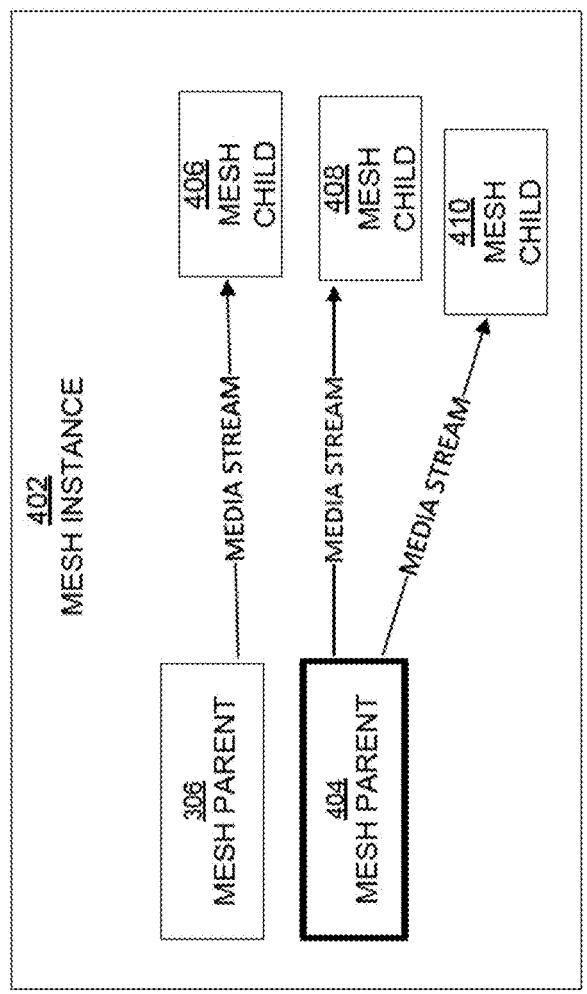
FIG. 4 is a diagram illustrating an exemplary environment in which some embodiments may operate.

As shown in diagram 400 of the example of FIG. 4, the Mesh Orchestrator 302 confirms an availability status of one or more of the respective client computer systems associated with those identified user accounts scheduled to attend (i.e., log onto) an online event. In some embodiments, the Mesh Orchestrator 302 detects that one or more particular computer systems at a logical location and included in a previously determined mesh definition are currently unavailable. At a moment of time proximate to (or concurrent with) a start time of the online event, the Mesh Orchestrator 302 instantiates a mesh instance 402 according to the mesh definition. However, the mesh instance 402 will be a grouping of the computer systems identified in the mesh definition that is further based on a modification of the mesh definition due to the unavailable computer systems. As such, the mesh instance 402 will be instantiated only with currently available computer systems that were also previously indicated for inclusion in the mesh definition. For example, the mesh instance 402 includes a mesh parent computer system 404 that was previously designated in the mesh definition to act as a mesh child and as a back-up mesh parent (i.e., secondary mesh parent). However, contingency logic updates the mesh child designation in order to designate the corresponding computer system to act as the mesh parent 404 in the mesh instance 402 as result of the Mesh Orchestrator 302 detecting that an initially designated mesh parent computer system is currently unavailable.

Figure 5:
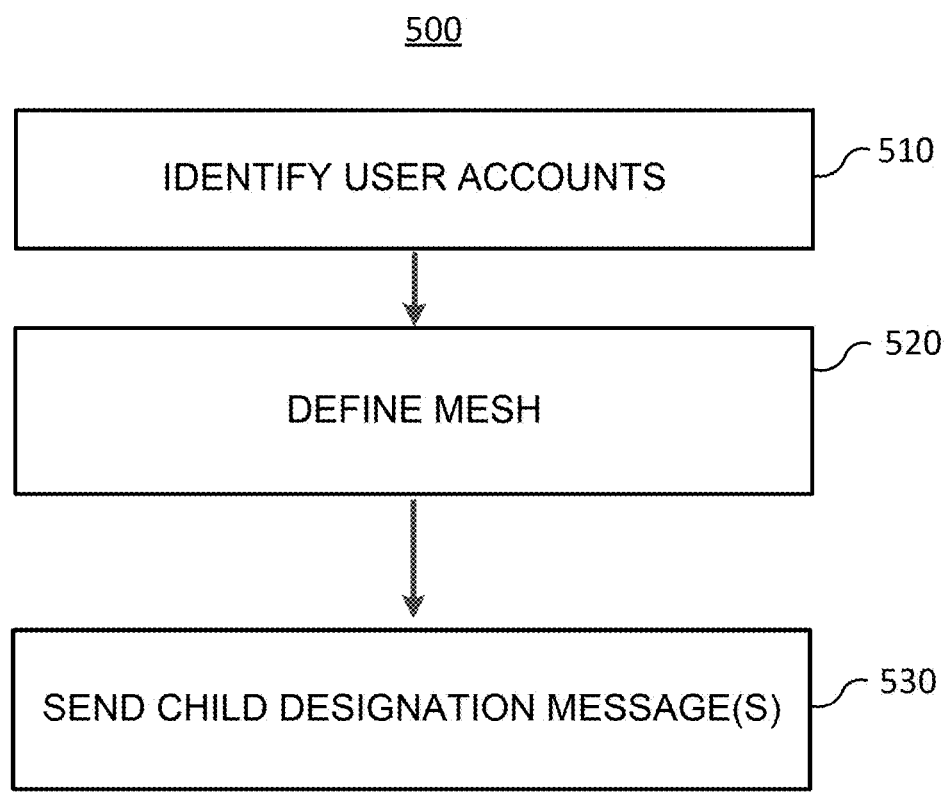
FIG. 5 is a diagram illustrating an exemplary flowchart according to some embodiments.

As shown in flowchart 500 of the example of FIG. 5, prior to initiation of an upcoming virtual meeting, the Mesh Orchestrator identifies one or more user accounts scheduled to participate in an upcoming virtual meeting delivered via a video communication environment (Act 510). For example, the video communication environment may have a client software application that is installed on one or more client computer systems at a logical location. The client software application may include a scheduling functionality for scheduling one or more online events. The scheduling functionality may further be integrated into (or include) a calendar functionality.

The Mesh Orchestrator accesses calendar data and identifies user accounts that are scheduled to attend an upcoming virtual meeting and further determines whether any of the user accounts are associated with a client computer system from a particular logical location. A logical location may be one or more network segments where the client computer systems are connected to a local area network (wired or wireless/wifi) and can communicate directly with one another through bi-directional L3 connectivity. Typically, a location will have limited bandwidth northbound either through a WAN connection and/or DIA (direct internet access). In some embodiments, a logical location may be explicitly defined and configured in an administrator portal of the video communication environment where groups of subnets are combined into the logical location. The maximum amount of bandwidth available to a particular logical location for video communication environment may further be defined via the administrator portal.

The Mesh Orchestrator defines a mesh of respective client computer systems associated with the one or more identified user accounts (Act 520). In some embodiments, the Mesh Orchestrator is a cloud service which defines, manages, monitors and modifies one or more mesh instances at various different logical locations. The Mesh Orchestrator is an intelligent service which evaluates mesh client computer system attributes to determine, rank and assign which client computer systems will function as a mesh parent(s) or as a mesh child upon initial mesh instantiation For example, a mesh parent is an identified client computer system which obtains the media stream from the Mesh Orchestrator and relays the media stream to one or more mesh child client computer systems in a mesh instance for a logical location. A mesh child consumes the media stream from a mesh parent situated at the same logical location. In some embodiments, the Mesh Orchestrator may promote a mesh child to be act as a new mesh parent if mesh conditions indicate that another mesh parent should be added—or a current mesh parent should be replaced due to poor performance or unavailability.

The Mesh Orchestrator sends a child designation message to at least one mesh child (Act 530). The child designation message indicates to a particular client computer system that is has been assigned the role of being a mesh child. In addition, the child designation message further identifies a specific mesh parent from which the mesh child should request the virtual meeting stream when the virtual meeting begins. As the virtual meeting proceeds, the Mesh Orchestrator actively monitors the operation and status of the mesh instance and adjusts the roles of the client computer systems in the mesh and which peers are in use based on mesh client computer system performance.

In some embodiments, the Mesh Orchestrator instantiates a mesh instance for active media redistribution as an online webinar begins according to the parent and child role assignments. As conditions change during the online webinar, the Mesh Orchestrator actively manages the mesh instance to ensure that a maximum allowed bandwidth allocated to the video communication environment at the logical location is not oversubscribed. For example, condition changes during the online webinar observed by the Mesh Orchestrator may be based on one or more of the following: user accounts joining or leaving the online webinar, changes in network conditions at a computer system or at the logical location, computer system utilization metrics. Each mesh parent and mesh child continually sends reporting messages to the Mesh Orchestrator with data that can indicate condition changes. By continually receiving the reporting messages, the Mesh Orchestrator receives information and data to initiate mesh healing procedures to heal (i.e., update, modify, change) a mesh instance before client buffers for mesh parents and mesh children are exhausted.

In some embodiments, a mesh definition that corresponds with a logical location will assign a minimum of two parents, a primary mesh parent and a secondary mesh parent. For example, a single mesh parent may be required to be active for a mesh instance based on a mesh definition of less than ten mesh children. It is understood that ten mesh children is an example value for illustrative purposes. However, the mesh definition may further designate one or more mesh children to act as secondary mesh parent(s). A secondary mesh parent is a mesh child that will be promoted to act as a mesh parent in a mesh instance if the scale of the mesh instance increases or if a current mesh parent fails. Upon instantiation of a mesh, the Mesh Orchestrator sends an identification of a primary mesh parent(s) and a secondary mesh parent(s) to each mesh child in a child designation message.

During an on online event (e.g., virtual meeting, online webinar), if a mesh child cannot pull a media stream from a primary mesh parent, the mesh child will attempt to grab the media stream from the secondary mesh parent and send a notification to the Mesh Orchestrator that there may be a possible failure occurring at the primary mesh parent. In response to the notification, the Mesh Orchestrator may apply contingency logic to heal the mesh by redistributing mesh parent and mesh child assignments to computer systems currently active in the mesh instance.

Figure 6:
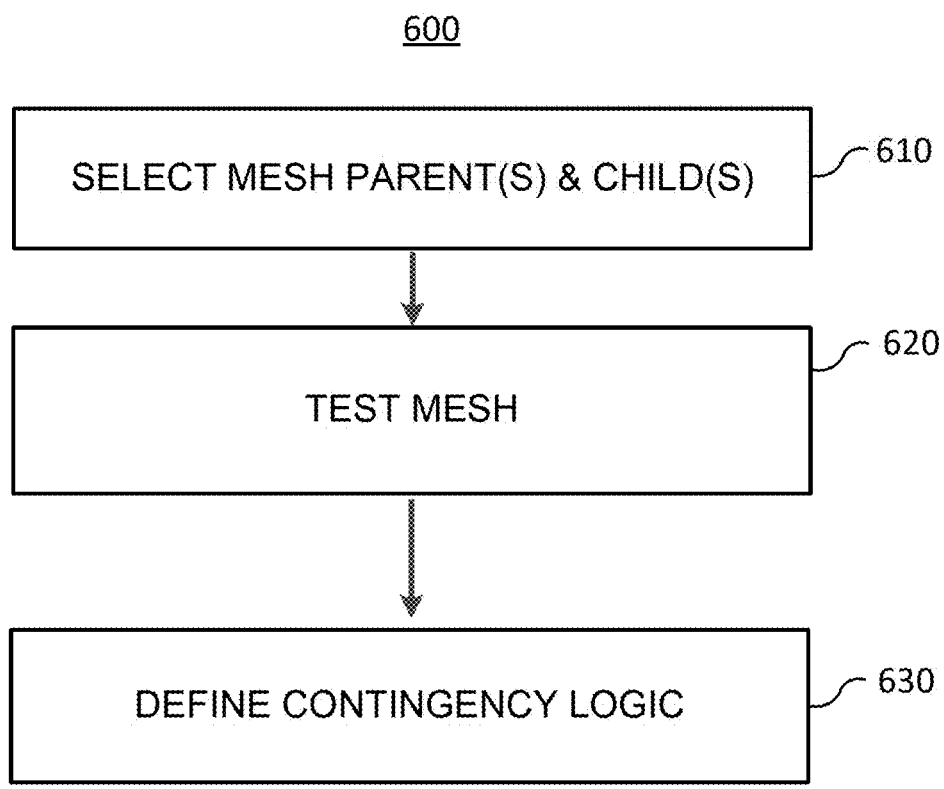
FIG. 6 is a diagram illustrating an exemplary flowchart according to some embodiments.

As shown in flowchart 600 of the example of FIG. 6, the Mesh Orchestrator selects one or more mesh parents and a mesh child (or mesh children) (Act 610). The Mesh Orchestrator accesses client computer system specific data generated by the video communication environment in order to determine which client computer systems will be designated as mesh parents and which will be mesh children. For example, the Mesh Orchestrator accesses historical virtual meeting data associated with each client computer system identified as being associated with a user account scheduled to attend the same upcoming virtual meeting and further located at (or assigned to) a particular logical location. Historical virtual meeting data may include data describing a client computer system's past performance as a mesh parent or mesh child in a previously instantiated mesh(es). Historical virtual meeting data may further include data describing an average amount of time before or after a start of a virtual meeting that the client computer system typically logs on.

When defining the mesh and selecting a mesh parent(s) and mesh children, the Mesh Orchestrator further accesses various types of system data or utilization data of each client computer system such as: client machine specifications (CPU model, total memory, storage capacity), current client machine conditions (active CPU, RAM, storage), a network connection type (wired/wifi), bandwidth, reliability, latency, peer-to-peer network connectivity and reliability as measured by bandwidth, latency and/or jitter. When instantiating a defined mesh, the Mesh Orchestrator accesses each client computer system's current availability state to determine whether the client computer system is currently available and/or currently logged onto the virtual meeting or is currently attempting to log onto the virtual meeting.

The Mesh Orchestrator runs one or more tests on the computer systems included in a mesh definition prior to initiation of the upcoming virtual meeting (Act 620). According to some embodiments, prior to initiation of the virtual meeting, the Mesh Orchestrator runs lightweight synthetic testing using video communication environment-specific video encoded to ensure the client computer systems assigned to a mesh definition will operate as expected. The client application software on each mesh client computer system reports back to the Mesh Orchestrator with data and analytics related to that computer system's performance, conditions and state during the test. It is understood that testing may be repetitively performed, such as running one or more tests every hour or every three hours (for example) prior to initiation of the upcoming virtual meeting.

The Mesh Orchestrator defines contingency logic prior to initiation of the upcoming virtual meeting (Act 630). Contingency logic includes commands for changing a mesh instance and/or mesh definition prior to or after instantiation. For example, in the event that the Mesh Orchestrator is unable to instantiate a mesh instance according to the mesh definition or the mesh instance experiences a failure, the Mesh Orchestrator executes contingency logic commands to update the mesh definition and/or mesh instance. In various embodiments, a failure may be identified when one or more of the client computer systems included in an instantiated mesh is unable to communicate with the Mesh Orchestrator.

In various embodiments, as the amount of total bandwidth allocated to the video communication environment per logical location is predetermined, the number of client computer systems in a mesh and logged onto a virtual meeting from a particular logical location is known by the Mesh Orchestrator and contingency logic may include fallback commands. Fallback commands may instruct a client computer system (s) in a mesh instance to reduce an amount of bandwidth that it uses during the virtual meeting. A fallback command may further instruct a client computer system in a mesh instance to display the virtual meeting via video communication environment client software according to a user interface layout which minimizes bandwidth consumption. For example, the Mesh Orchestrator may execute a command(s) for one or more client computer system(s) in a mesh instance to switch from a user interface grid layout to an active speaker layout. If content is being shared between client computer systems in the mesh instance, a contingency logic command may be executed to further reduce a frame rate of the shared content.

In some embodiments, the Mesh Orchestrator may apply contingency logic to determine which type of stream to be sent to a mesh parent(s). For example, depending on current availability and operational status of the computer systems in a mesh instance, the Mesh Orchestrator may select one or more of an audio content stream, a video content stream and a content stream of a virtual meeting to be transmitted to a mesh parent(s).

According to various exemplary embodiments, prior to initiation of an upcoming virtual meeting, the Mesh Orchestrator identifies one or more user accounts scheduled to participate in an upcoming virtual meeting delivered via a video communication environment. For example, the Mesh Orchestrator accesses calendar data of the video communication environment and identifies the one or more user accounts in the calendar data. For example, the calendar data may indicate one or more user accounts that have accepted invitations to attend a particular virtual meeting. The Mesh Orchestrator defines a mesh of a group of respective client computer systems at a same logical location and associated with the identified user accounts. The mesh is defined as including at least one mesh parent client computer system ("mesh parent") and at least one mesh child client computer system ("mesh child"). In order to define the mesh, the Mesh Orchestrator identifies a first client computer system as the mesh parent based at least on the first client computer system's historical virtual meeting data. The Mesh Orchestrator identifies a second client computer system as the mesh child based at least on the second client computer system's historical virtual meeting data. In addition, the Mesh Orchestrator identifies a third client computer system as a mesh back-up parent client computer system ("mesh back-up parent") based at least on the third client computer system's historical virtual meeting data. A mesh child is designated to receive the one or more portions of the media stream of the virtual meeting from the at least one mesh parent. A mesh parent is designated for distribution of the one or more portions of the media stream of the virtual meeting.

According to various embodiments, the Mesh Orchestrator selects, based on historical virtual meeting data, one or more mesh children to receive the one or more portions of the media stream of the virtual meeting from the at least one mesh parent. The Mesh Orchestrator also selects, based on the historical virtual meeting data, the at least one mesh parent for distribution of the one or more portions of the media stream of the virtual meeting. The historical virtual meeting data is generated by a video communication environment delivering the media stream for the upcoming virtual meeting. Historical virtual meeting data may be mesh parent performance data indicating performance metrics from distributing respective previous media streams to one or more mesh children in at least one previously implemented mesh. Historical virtual meeting data may be packet loss data associated with respective previous media streams of one or more previous virtual meetings. Historical virtual meeting data may be mesh child performance data indicating performance metrics from receiving respective previous media streams distributed by one or more mesh parents in at least one previously implemented mesh.

Prior to initiation of the upcoming virtual meeting, the Mesh Orchestrator performs one or more tests on the computer systems of the defined mesh. Prior to initiation of the upcoming virtual meeting, the Mesh Orchestrator may also define mesh contingency logic for applying one or more changes to an implemented version of the mesh (e.g., a mesh instance) during the upcoming virtual meeting. The mesh contingency logic may include one or more commands for at least one of: selecting a new mesh parent for an implemented version of the mesh during the upcoming virtual meeting, setting a maximum bandwidth for at least one client computer system in an implemented version of the mesh during the upcoming virtual meeting and setting a required upcoming virtual meeting display layout for at least one client computer system in an implemented version of the mesh during the upcoming virtual meeting.

According to various embodiments, the Mesh Orchestrator may be a cloud computing resource(s). The respective client computer systems associated with the one or more identified user accounts belong to one or more networks segments at a same logical location. For example, the logical location may be defined as allowing for a certain maximum amount of available bandwidth for the video communication environment to deliver one or more virtual meeting media streams to the respective client computer systems.

During the upcoming virtual meeting, the Mesh Orchestrator receives one or more messages from a mesh parent(s) and/or from a mesh child (or mesh children). For example, the message indicates at least one of: attendance status of the upcoming virtual meeting by the client computer system, a network condition experienced by the client computer system and a machine utilization of the client computer system. In some embodiments, the Mesh Orchestrator applies a change(s) to an active mesh instance, according to contingency logic, based on and in response to one or more of the received messages.

Figure 7:
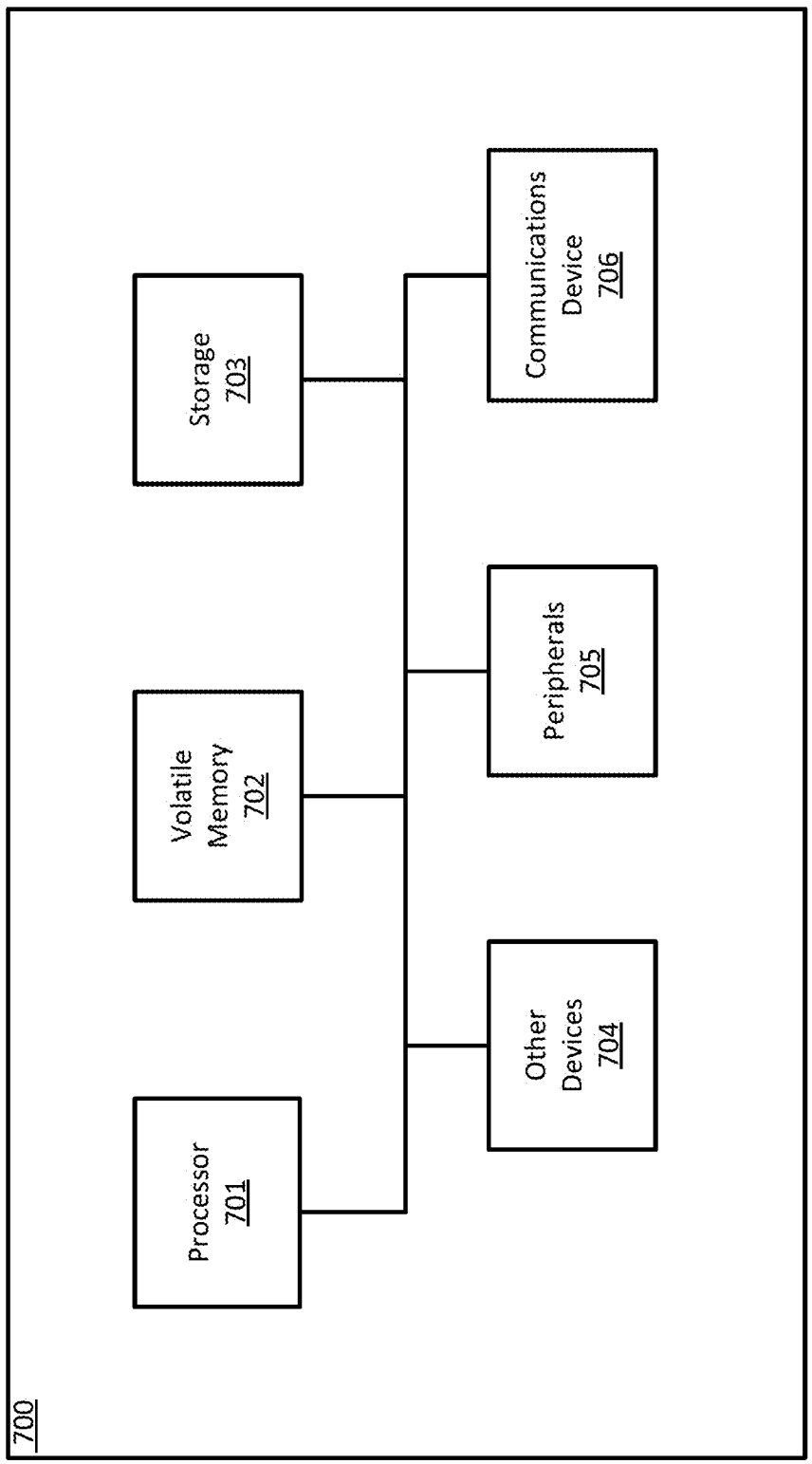
FIG. 7 is a diagram illustrating an exemplary environment in which some embodiments may operate.

FIG. 7 is a diagram illustrating an exemplary computer that may perform processing in some embodiments. As shown in the example of FIG. 7, an exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 7.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 700 to an external medium. For example, communications device 706 may take the form of a network adapter that provides communications to a network. A computer 700 may also include a variety of other devices 704. The various components of the computer 700 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computer device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

It will be appreciated that the present disclosure may include any one and up to all of the following examples.

Example 1: A computer-implemented method comprising: prior to initiation of an upcoming virtual meeting: identifying one or more user accounts scheduled to participate in an upcoming virtual meeting; defining a mesh of respective client computer systems associated with the one or more identified user accounts, the mesh defined as including at least one mesh parent client computer system ("mesh parent") and at least one mesh child client computer system ("mesh child"); and sending a respective message to at least one mesh child, the respective message identifying a particular mesh parent from which to request one or more portions of a media stream of the virtual meeting.

Example 2: The method of Example 1, wherein defining a mesh of respective client computer systems associated with the one or more identified user accounts comprises: identifying a first client computer system as the mesh parent based at least on the first client computer system's historical virtual meeting data; identifying a second client computer system as the mesh child based at least on the second client computer system's historical virtual meeting data; and identifying a third client computer system as a mesh back-up parent client computer system ("mesh back-up parent") based at least on the third client computer system's historical virtual meeting data.

Example 3: The method of any Examples 1-2, wherein defining a mesh of respective client computer systems associated with the one or more identified user accounts comprises: selecting, based on historical virtual meeting data, one or more mesh children to receive the one or more portions of the media stream of the virtual meeting from the at least one mesh parent; and selecting, based on the historical virtual meeting data, the at least one mesh parent for distribution of the one or more portions of the media stream of the virtual meeting.

Example 4: The method of any Examples 1-3, further comprising: prior to initiation of the upcoming virtual meeting, performing one or more tests of the defined mesh.

Example 5: The method of any Examples 1-4, further comprising: prior to initiation of the upcoming virtual meeting, defining mesh contingency logic for applying one or more changes to an implemented version of the mesh during the upcoming virtual meeting.

Example 6: The method of any Examples 1-5, further comprising: performing the identifying one or more user accounts, defining the mesh and the sending at least a portion of the media stream via one or more cloud computing resources; wherein the respective client computer systems associated with the one or more identified user accounts belong to one or more networks segments at a same logical location.

Example 7: The method of any Examples 1-6, further comprising: confirming an availability status of one or more of the respective client computer systems associated with the one or more identified user accounts at a moment of time proximate to a start time of the virtual meeting; and instantiating a mesh instance according to a mesh definition, one or more available respective client computer systems and contingency logic.

Example 8: A non-transitory computer-readable medium having a computer-readable program code embodied therein to be executed by one or more processors, the program code including instructions for: prior to initiation of an upcoming virtual meeting: identifying one or more user accounts scheduled to participate in an upcoming virtual meeting; defining a mesh of respective client computer systems associated with the one or more identified user accounts, the mesh defined as including at least one mesh parent client computer system ("mesh parent") and at least one mesh child client computer system ("mesh child"); and sending a respective message to at least one mesh child, the respective message identifying a particular mesh parent from which to request one or more portions of a media stream of the virtual meeting Example 9: The non-transitory computer-readable medium of Example 8, wherein defining a mesh of respective client computer systems associated with the one or more identified user accounts comprises: selecting, based on historical virtual meeting data, one or more mesh children to receive the one or more portions of the media stream of the virtual meeting from the at least one mesh parent; and selecting, based on the historical virtual meeting data, the at least one mesh parent for distribution of the one or more portions of the media stream of the virtual meeting, the historical virtual meeting data generated by a video communication environment delivering the media stream of the upcoming virtual meeting.

Example 10: The non-transitory computer-readable medium of any Examples 8-9, further comprising: prior to initiation of the upcoming virtual meeting, defining mesh contingency logic comprising a command for selecting a new mesh parent for an implemented version of the mesh during the upcoming virtual meeting.

Example 11: The non-transitory computer-readable medium of any Examples 8-10, further comprising: prior to initiation of the upcoming virtual meeting, defining mesh contingency logic comprising a command for setting a maximum bandwidth for at least one client computer system in an implemented version of the mesh during the upcoming virtual meeting.

Example 12: The non-transitory computer-readable medium of any Examples 8-11, further comprising: prior to initiation of the upcoming virtual meeting, defining mesh contingency logic comprising a command for setting a required upcoming virtual meeting display layout for at least one client computer system in an implemented version of the mesh during the upcoming virtual meeting.

Example 13: The non-transitory computer-readable medium of any Examples 8-12, further comprising: wherein the respective client computer systems associated with the one or more identified user accounts belong to one or more networks segments at a same logical location, the logical location allowing for a maximum amount of available bandwidth for a video communication environment that delivers one or more virtual meeting media streams to the respective client computer systems.

Example 14: A communication system comprising one or more processors configured to perform the operations of: prior to initiation of an upcoming virtual meeting: identifying one or more user accounts scheduled to participate in an upcoming virtual meeting; defining a mesh of respective client computer systems associated with the one or more identified user accounts, the mesh defined as including at least one mesh parent client computer system ("mesh parent") and at least one mesh child client computer system ("mesh child"); and sending a respective message to at least one mesh child, the respective message identifying a particular mesh parent from which to request one or more portions of a media stream of the virtual meeting.

Example 15: The communication system of Example 14, wherein defining a mesh of respective client computer systems associated with the one or more identified user accounts comprises: selecting, based on historical virtual meeting data, one or more mesh children to receive the one or more portions of the media stream of the virtual meeting from the at least one mesh parent; and selecting, based on the historical virtual meeting data, the at least one mesh parent for distribution of the one or more portions of the media stream of the virtual meeting, the historical virtual meeting data generated by a video communication environment delivering the media stream for the upcoming virtual meeting; wherein the historical virtual meeting data at least comprises packet loss data associated with respective previous media streams of one or more previous virtual meetings.

Example 16: The communication system of any Examples 14-15, wherein defining a mesh of respective client computer systems associated with the one or more identified user accounts comprises: selecting, based on the historical virtual meeting data, the at least one mesh parent for distribution of the one or more portions of the media stream of the virtual meeting, the historical virtual meeting data generated by a video communication environment delivering the media stream for the upcoming virtual meeting; wherein the historical virtual meeting data at least comprises mesh parent performance data indicating performance metrics from distributing respective previous media streams to one or more mesh children in at least one previously implemented mesh.

Example 17, The communication system of any Examples 14-16, wherein defining a mesh of respective client computer systems associated with the one or more identified user accounts comprises: selecting, based on historical virtual meeting data, one or more mesh children to receive the one or more portions of the media stream of the virtual meeting from the at least one mesh parent, the historical virtual meeting data generated by a video communication environment delivering the media stream for the upcoming virtual meeting; wherein the historical virtual meeting data at least comprises mesh child performance data indicating performance metrics from receiving respective previous media streams distributed by one or more mesh parents in at least one previously implemented mesh.

Example 18, The communication system of any Examples 14-17, wherein identifying one or more user accounts scheduled to participate in an upcoming virtual meeting comprises: accessing calendar data of a video communication environment delivering the media stream for the upcoming virtual meeting; and identifying the one or more user accounts in the calendar data.

Example 19, The communication system of any Examples 14-18, further comprising operations of: during the upcoming virtual meeting: receiving one or more messages from the at least one mesh parent and the at least one mesh child, the messages indicating at least one of: attendance status of the upcoming virtual meeting by the client computer system, a network condition experienced by the client computer system and a machine utilization of the client computer system.

Example 20, The communication system of any Examples 14-19, further comprising operations of: during the upcoming virtual meeting: applying a change to the mesh based in response to at least on one or more messages received from the at least one mesh parent and the at least one mesh child, the messages indicating at least one of: attendance status of the upcoming virtual meeting by the client computer system, a network condition experienced by the client computer system and a machine utilization of the client computer system.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method comprising:
    prior to initiation of an upcoming virtual meeting:
        identifying one or more user accounts scheduled to participate in an upcoming virtual meeting;
        defining a mesh of respective client computer systems associated with the one or more identified user accounts, the mesh defined as including at least one mesh parent client computer system ("mesh parent") and at least one mesh child client computer system ("mesh child"); and
        sending a respective message to at least one mesh child associated with a first user account, the respective message identifying a particular mesh parent associated with a second user account from which to request one or more portions of a media stream of the upcoming virtual meeting, the first user account different than the second user account.

2. The computer-implemented method of claim 1, wherein defining a mesh of respective client computer systems associated with the one or more identified user accounts comprises:

identifying a first client computer system as the mesh parent based at least on the first client computer system's historical virtual meeting data;

identifying a second client computer system as the mesh child based at least on the second client computer system's historical virtual meeting data; and identifying a third client computer system as a mesh back-up parent client computer system ("mesh back-up parent") based at least on the third client computer system's historical virtual meeting data.

3. The computer-implemented method of claim 1, wherein defining a mesh of respective client computer systems associated with the one or more identified user accounts comprises:

selecting, based on historical virtual meeting data, one or more mesh children to receive the one or more portions of the media stream of the upcoming virtual meeting from the at least one mesh parent; and selecting, based on the historical virtual meeting data, the at least one mesh parent for distribution of the one or more portions of the media stream of the upcoming virtual meeting.

4. The computer-implemented method of claim 1, further comprising:

prior to initiation of the upcoming virtual meeting, performing at least one of:
(i) performing one or more tests of the defined mesh; and
(ii) defining mesh contingency logic for applying one or more changes to an implemented version of the mesh during the upcoming virtual meeting.

5. The computer-implemented method of claim 1, further comprising:

performing the identifying one or more user accounts, defining the mesh and the sending at least a portion of the media stream via one or more cloud computing resources;

wherein the respective client computer systems associated with the one or more identified user accounts belong to one or more networks segments at a same logical location.

6. The computer-implemented method of claim 1, further comprising:

confirming an availability status of one or more of the respective client computer systems associated with the one or more identified user accounts at a moment of time proximate to a start time of the upcoming virtual meeting; and instantiating a mesh instance according to a mesh definition, one or more available respective client computer systems and contingency logic.

7. A non-transitory computer-readable medium having a computer-readable program code embodied therein to be executed by one or more processors, the program code including instructions for:

prior to initiation of an upcoming virtual meeting:
identifying one or more user accounts scheduled to participate in an upcoming virtual meeting;
defining a mesh of respective client computer systems associated with the one or more identified user accounts, the mesh defined as including at least one mesh parent client computer system ("mesh parent") and at least one mesh child client computer system ("mesh child"); and
sending a respective message to at least one mesh child associated with a first user account, the respective message identifying a particular mesh parent associated with a second user account from which to request one or more portions of a media stream of the upcoming virtual meeting, the first user account different than the second user account.

8. The non-transitory computer-readable medium of claim 7, wherein defining a mesh of respective client computer systems associated with the one or more identified user accounts comprises:

selecting, based on historical virtual meeting data, one or more mesh children to receive the one or more portions of the media stream of the upcoming virtual meeting from the at least one mesh parent; and selecting, based on the historical virtual meeting data, the at least one mesh parent for distribution of the one or more portions of the media stream of the upcoming virtual meeting, the historical virtual meeting data generated by a video communication environment delivering the media stream of the upcoming virtual meeting.

9. The non-transitory computer-readable medium of claim 7, further comprising:

prior to initiation of the upcoming virtual meeting, defining mesh contingency logic comprising a command for selecting a new mesh parent for an implemented version of the mesh during the upcoming virtual meeting.

10. The non-transitory computer-readable medium of claim 7, further comprising:

prior to initiation of the upcoming virtual meeting, defining mesh contingency logic comprising a command for setting a maximum bandwidth for at least one client computer system in an implemented version of the mesh during the upcoming virtual meeting.

11. The non-transitory computer-readable medium of claim 7, further comprising:

prior to initiation of the upcoming virtual meeting, defining mesh contingency logic comprising a command for setting a required upcoming virtual meeting display layout for at least one client computer system in an implemented version of the mesh during the upcoming virtual meeting.

12. The non-transitory computer-readable medium of claim 7, further comprising:

wherein the respective client computer systems associated with the one or more identified user accounts belong to one or more networks segments at a same logical location, the logical location allowing for a maximum amount of available bandwidth for a video communication environment that delivers one or more virtual meeting media streams to the respective client computer systems.

13. A communication system comprising one or more processors configured to perform the operations of:

prior to initiation of an upcoming virtual meeting:
identifying one or more user accounts scheduled to participate in an upcoming virtual meeting;
defining a mesh of respective client computer systems associated with the one or more identified user accounts, the mesh defined as including at least one mesh parent client computer system ("mesh parent") and at least one mesh child client computer system ("mesh child"); and
sending a respective message to at least one mesh child associated with a first user account, the respective message identifying a particular mesh parent associated with a second user account from which to request the one or more portions of the media stream of the upcoming virtual meeting, the first user account different than the second user account.

14. The communications system of claim 13, wherein defining a mesh of respective client computer systems associated with the one or more identified user accounts comprises:
- selecting, based on historical virtual meeting data, one or more mesh children to receive the one or more portions of the media stream of the upcoming virtual meeting from the at least one mesh parent; and
- selecting, based on the historical virtual meeting data, the at least one mesh parent for distribution of the one or more portions of the media stream of the upcoming virtual meeting, the historical virtual meeting data generated by a video communication environment delivering the media stream for the upcoming virtual meeting;
  - wherein the historical virtual meeting data at least comprises packet loss data associated with respective previous media streams of one or more previous virtual meetings.

15. The communications system of claim 13, wherein defining a mesh of respective client computer systems associated with the one or more identified user accounts comprises:
- selecting, based on the historical virtual meeting data, the at least one mesh parent for distribution of the one or more portions of the media stream of the upcoming virtual meeting, the historical virtual meeting data generated by a video communication environment delivering the media stream for the upcoming virtual meeting;
  - wherein the historical virtual meeting data at least comprises mesh parent performance data indicating performance metrics from distributing respective previous media streams to one or more mesh children in at least one previously implemented mesh.

16. The communications system of claim 13, wherein defining a mesh of respective client computer systems associated with the one or more identified user accounts comprises:
- selecting, based on historical virtual meeting data, one or more mesh children to receive the one or more portions of the media stream of the upcoming virtual meeting from the at least one mesh parent, the historical virtual meeting data generated by a video communication environment delivering the media stream for the upcoming virtual meeting;
  - wherein the historical virtual meeting data at least comprises mesh child performance data indicating performance metrics from receiving respective previous media streams distributed by one or more mesh parents in at least one previously implemented mesh.

17. The communications system of claim 13, wherein identifying one or more user accounts scheduled to participate in an upcoming virtual meeting comprises:
- accessing calendar data of a video communication environment delivering the media stream for the upcoming virtual meeting; and
- identifying the one or more user accounts in the calendar data.

18. The communications system of claim 13, further comprising operations of:
- during the upcoming virtual meeting:
  - receiving one or more messages from the at least one mesh parent and the at least one mesh child, the messages indicating at least one of: attendance status of the upcoming virtual meeting by the client computer system, a network condition experienced by the client computer system and a machine utilization of the client computer system.

19. The communications system of claim 13, further comprising operations of:
- during the upcoming virtual meeting:
  - applying a change to the mesh based in response to at least on one or more messages received from the at least one mesh parent and the at least one mesh child, the messages indicating at least one of: attendance status of the upcoming virtual meeting by the client computer system, a network condition experienced by the client computer system and a machine utilization of the client computer system.

* * * * *

UNITED STATES PATENT AND TRADEMARK OFFICE
CERTIFICATE OF CORRECTION

PATENT NO. : 11,689,591 B2
APPLICATION NO. : 17/515488
DATED : June 27, 2023
INVENTOR(S) : Nicholas Sieracki and Michael White It is certified that error appears in the above-identified patent and that said Letters Patent is hereby corrected as shown below:

On the Title Page

Replace "Castle Rock, CO (US)", item (72) with "Alpine, UT (US)"

Signed and Sealed this
Fifth Day of September, 2023

Katherine Kelly Vidal
*Director of the United States Patent and Trademark Office*